United States Patent [19]

Karubian et al.

[11] Patent Number: 4,627,167
[45] Date of Patent: Dec. 9, 1986

[54] LEG SHEAR

[75] Inventors: Ralph K. Karubian; Gregorio J. Coelho, both of Los Angeles, Calif.

[73] Assignee: Kentmaster Mfg. Co., Inc., Los Angeles, Calif.

[21] Appl. No.: 750,175

[22] Filed: Jul. 1, 1985

[51] Int. Cl.⁴ .......................................... B26B 15/00
[52] U.S. Cl. ........................................ 30/228; 30/241
[58] Field of Search ............... 30/180, 182, 228, 241, 30/271

[56] References Cited

U.S. PATENT DOCUMENTS 3,138,869  6/1964  Parhaniemi ...................... 30/180 X
4,026,028  5/1977  Green ............................. 30/241 X Primary Examiner—Douglas D. Watts
Attorney, Agent, or Firm—Bruce L. Birchard

[57] ABSTRACT

An improved leg shear for use in slaughterhouses includes a movable blade supported in opposed tracks throughout its travel, such movable blade having flat "stop" portions at opposite ends of its cutting edge which, at the end of the travel of the movable blade in its cutting direction, engages an adjustably fixed spacer plate carried in the frame to provide a positive stop for the movable blade, the shear including, in addition, a fixed blade supported by the frame of the shear and sloped with respect to the movable blade to provide a scissorlike shearing of the object to be cut.

3 Claims, 5 Drawing Figures

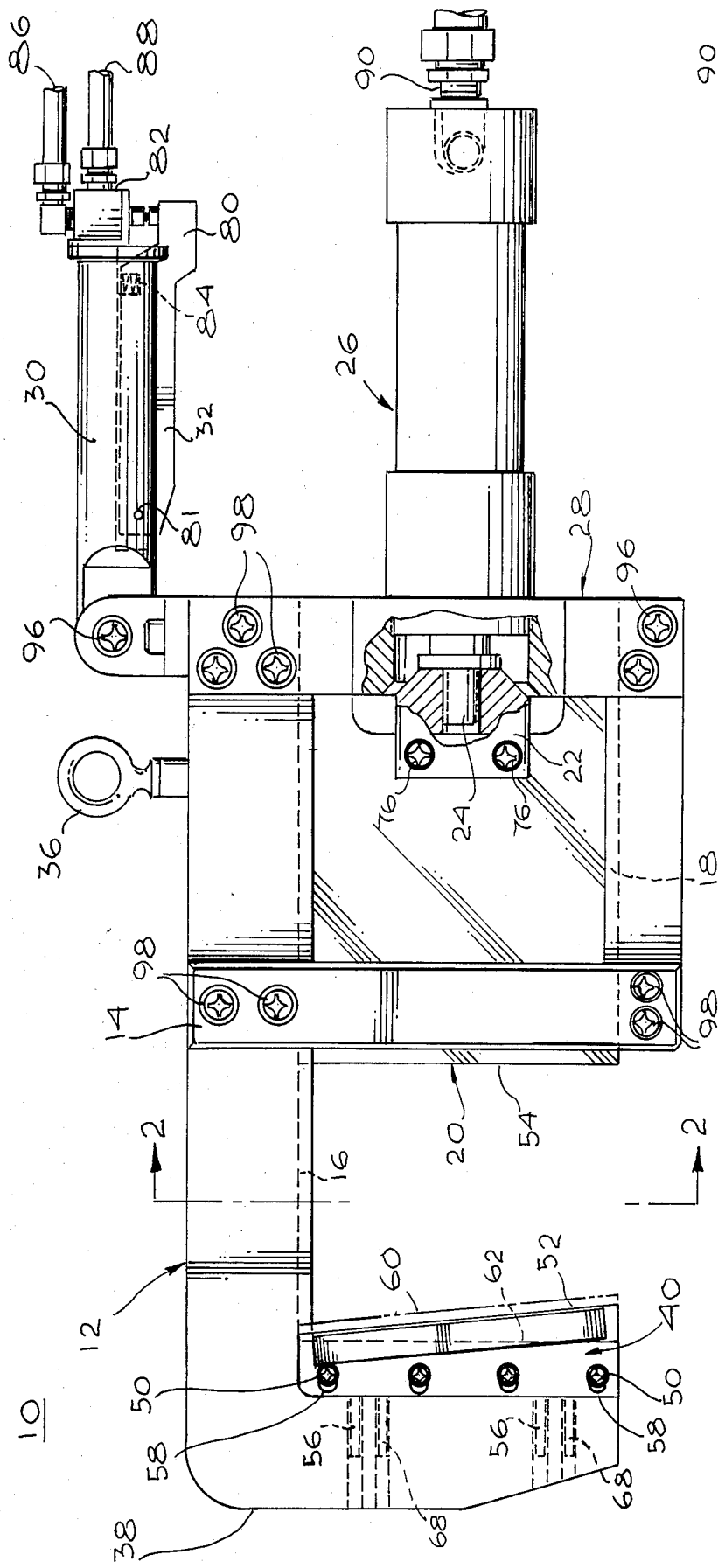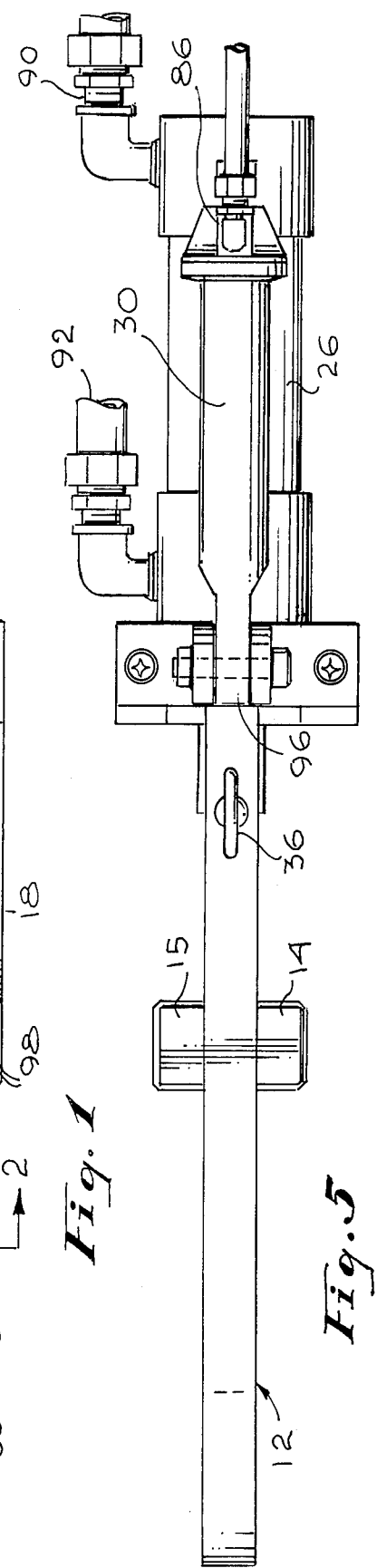

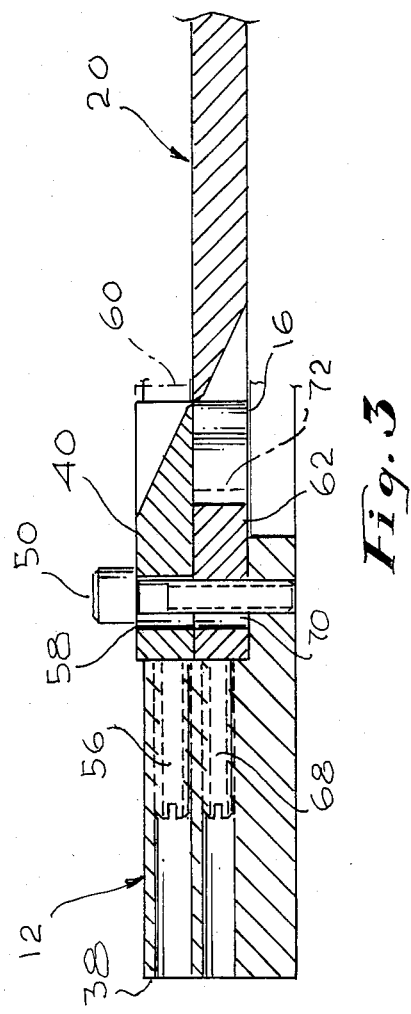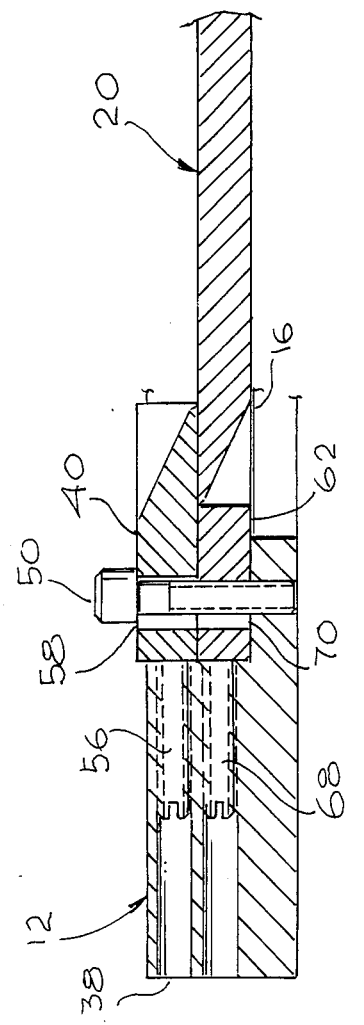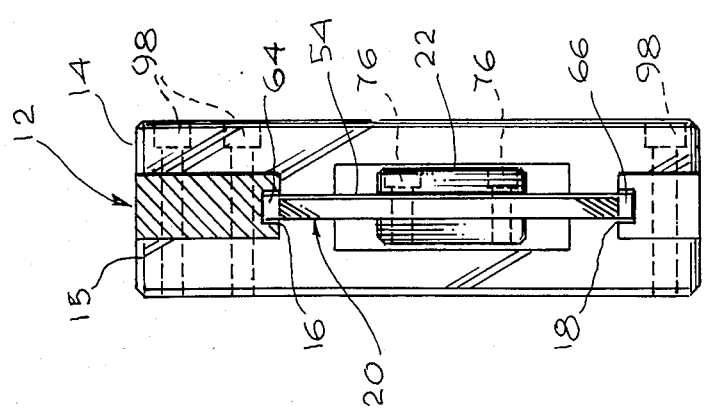

LEG SHEAR

BACKGROUND OF THE INVENTION

1. Field of the Invention

This invention relates to the field of slaughterhouse machines and more particularly to leg shears for use in such slaughterhouses.

2. Prior Art

A search of prior art patents revealed the following U.S. Patents which are related to but do not anticipate the present invention.

U.S. Pat. No. 2,714,250 (Twedt) shows an hydraulically driven pruning tool in which an anvil 31 is driven against a blade or edge 44 for severing the branch on a tree. The direct contact of the blade or edge on the anvil causes dulling of the edge and possible breakage of the edge.

U.S. Pat. No. 2,644,194 (Fill) shows a V-shaped, hydraulically driven, cutting edge 30' which engages an anvil 31 having a V-shaped surface terminating in apex 36, shaped and positioned to receive edge 30' for cutting an aitchbone. Again edge 30' directly engages an anvil surface and will be dulled with use.

Therefore, it is an object of this invention to provide an improved leg shear which will be free of the problems recited for the prior art.

It is a further object of this invention to provide a leg shear which will provide clean cutting of a carcass leg without being dulled or broken.

SUMMARY OF THE INVENTION

The cutting blade in the leg shear according to my invention, is supported, throughout its operation, on two edges so as to prevent its bending and breaking and, further, the movable blade has flat portions at opposite ends of its cutting edge, which flat portions, at the end of the travel of the movable blade, engage an adjustably fixed spacer plate carrier in the frame of the shear, to provide a positive stop for the movable blade without relying upon the cutting edge to achieve this end. The shear includes a fixed-blade adjustably supported by the frame of the shear, and sloped with respect to the movable blade so that, as the movable blade passes over the fixed-blade a scissorlike shearing of the object being cut occurs. The brunt of the stopping of the movable blade is carried by the spacer plate and the top and bottom flat ends of the movable blade, thus preventing damage to the movable blade or edge. The extent of the motion of the piston driving the movable blade being limited to correspond to the distance between the cutting edge of the movable blade and the spacer plate in the "open" position of the movable blade.

BRIEF DESCRIPTION OF THE DRAWINGS

Features of the present invention which are believed to be novel are set forth with particularity in the appended claims. The present invention both as to its organization and manner of operation, together with further objects and advantages thereof, may be best understood by a reference to the following description taken in connection with the accompanying drawings, in which:

FIG. 1 is an elevational view, partially cut away, of the leg shear according to my invention;

FIG. 2 is a view taken along line 2—2 in FIG. 1;

FIG. 3 is a mechanical schematic diagram showing the leg shear of FIG. 1 in a first stage of operation;

FIG. 4 is a mechanical schematic diagram showing the leg shear of FIG. 1 in a second step of operation; and FIG. 5 is a top view of the leg shear of FIG. 1.

DETAILED DESCRIPTION OF THE PREFERRED EMBODIMENT

In FIG. 1, leg shear 10 has frame 12 with reinforcing braces 14, 15 on opposite sides, thereof, as can be seen more clearly in FIG. 5. As can be seen more clearly in FIG. 2, frame 12 has upper and lower grooves 16 and 18, therein. The purpose of grooves 16 and 18 is to guide movable blade 20 throughout its travel. Movable blade 20 is supported in clevis 22 which, in turn, is coupled through piston rod 24 to a piston, not shown, in hydraulic actuator 26 which is carried by mounting block 28 in frame 12.

Handle 30 is secured to frame 12 and carries trigger 32 for activating hydraulic actuator 26. Ring 36 is secured to frame 12 and is provided to permit counter-balancing of the weight of leg shear 12 to reduce the physical strain upon the operator of the leg shear during its use.

Frame 12 terminates at its end remote from mounting block 28 in a depending anvil portion 38 which carries, thereon, fixed blade 40. Fixed blade 40 may be adjustably or fixedly secured to anvil portion 38 of frame 12 by means of Allen-head screws 50.

It is to be noted that fixed-blade 40 has its cutting edge 52 sloped with respect to the cutting edge 54 of movable blade 20 so that the overlaping engagement of movable blade 20 with fixed blade 40 acts in scissor-like fashion to cut the intended member. While the position of fixed-blade 40 is normally fixed, it may be made adjustable, in vernier fashion, by providing set screws 56, seen in FIGS. 1, 3 and 4 and slots 58 which receive Allen-head screws 50. The extent of vernier movement of fixed-blade 40 which can thus be achieved is represented by broken line 60 in FIG. 3.

The maximum travel of movable blade 20 towards fixed-blade 40 is controlled by two factors. First, the length of travel of piston rod 24 in cylinder 26 and second by spacing plate 62, seen in FIGS. 3 and 4. Movable blade 20 has, at the upper and lower extremities of its cutting edge 54, a pair of flat block portions 64, 66 which are aligned with the cutting edge 54 and engage spacing plate 62 at the line of maximum travel of movable blade 20 towards fixed-blade 40. As can be seen in FIGS. 3 and 4, spacing plate 62 is adjustable along the line of travel of movable blade 20 by means of set screws 68 as a result of the elongated nature of slots 70. The extent of possible adjustment is indicated by broken line 72 in FIG. 3. Thus, the spacing plate 62 can be adjusted so that the cutting action of movable blade 20 in combination with fixed-blade 40 ends just as, not before or after, flat block regions 64, 66 engage spacing plate 62. Damage to the cutting edge 54 is thus prevented while thorough shearing of the leg member is assured.

Movable blade 20 is firmly retained in clevis 22 by screws 76.

Handle 30 (FIG. 1) carries trigger 80 pivotably thereon, as by pivot 81. Trigger 80 activates valve 82 when trigger 80 is pressed against the opposing force of spring 84, permitting compressed air, from a source not shown, to pass from air inlet 86 thru valve 82 and out of air outlet 88 to an hydraulic power amplifier, not shown, which, in turn, provides to oil inlet 90 on hydraulic activator or cylinder 26, hydraulic fluid under high pressure to cause piston rod 24, carrying movable blade 20, to move forward towards fixed-blade 40 with great force, any bone or flesh being cut promptly and cleanly by the scissor-action of blades 20 and 40.

FIG. 3 shows the relative positions of movable blade 20 and fixed blade 40 at the commencement of the cutting action. FIG. 4 shows the relative positions of those blades when cutting is completed. Movable blade 20 is slidably supported in grooves 16, 18 so as to make a sliding engagement between its cutting edge 54 and the cutting edge 52 of fixed blade 40.

Once piston rod 24 has reached the maximum extent of its travel, flat portions 64, 66 of movable blade 20 engage spacing plate 62 and movable blade 20 must be returned to its original position. A pilot-controlled 4-way valve, not shown, switches the compressed air formerly at air inlet 86 to blade-return air inlet 92 (FIG. 5) and the piston in cylinder is reversed in its motion and carries blade 20 to its open position.

Handle 30 is pivoted from frame 12 by pivot ball 96. Screws 98 hold frame 12 rigid.

While a particular embodiment of my invention has been shown and described, it will be apparent to those skilled in the art that variations and modifications may be made therein without departing from the spirit and scope of my invention. It is the purpose of the appended claims to cover all such variations and modifications.

I claim:

1. A leg shear including a frame having opposed upper and lower members and an anvil portion depending from said upper member, said opposed upper and lower members having opposed grooves in the edges thereof facing and parallel to each other;

a movable blade slidably carried in said opposed grooves and having a first rectilinear cutting edge normal to said grooves;

a fixed blade having a second rectilinear cutting edge, said fixed-blade being supported from said anvil portion with said second rectilinear cutting edge positioned facing said first rectilinear cutting edge and laterally displaced from alignment with said first rectilinear cutting edge a distance such that said movable blade makes sliding contact with said fixed blade when said first rectilinear cutting edge passes over said second rectilinear cutting edge during movement of said movable blade, said second rectilinear cutting edge lying in a plane parallel to the plane in which said first rectilinear cutting edge lies, and said second rectilinear cutting edge being non-parallel with said first rectilinear cutting edge;

said movable blade being supported throughout its travel by at least one of said opposed grooves;

a spacing plate supported in said frame in contiguous relation to said fixed blade and parallel to and aligned with said movable blade but recessed from said second rectilinear cutting edge;

said movable blade carrying at opposite ends of said first rectilinear cutting edge blocks having a flat surface aligned with said first rectilinear cutting edge and with said spacing plate;

said spacing plate and said first rectilinear cutting edge being adjustable in position along the direction of the path of said movable blade.

2. Apparatus according to claim 1 which includes, in addition, actuator means carried by said frame for moving said movable blade towards said fixed-blade.

3. Apparatus according to claim 2 in which said actuator means are hydraulic.

* * * * *